United States Patent [19]

Wilson

[11] 4,244,434

[45] Jan. 13, 1981

[54] ELECTRONICALLY INDICATING TORQUE WRENCH

[76] Inventor: John T. R. Wilson, 736 Lynnhaven La., La Canada, Calif. 91011

[21] Appl. No.: 966,395

[22] Filed: Dec. 4, 1978

Related U.S. Application Data

[63] Continuation-in-part of Ser. No. 892,303, Mar. 31, 1978.

[51] Int. Cl.² .................. G01G 19/00; G01L 5/24; B25D 23/142
[52] U.S. Cl. .................. 177/245; 73/139; 81/477; 81/467
[58] Field of Search .................. 177/210 FP, 245; 81/52.5; 73/139

[56] References Cited

U.S. PATENT DOCUMENTS

| 1,958,326 | 5/1934 | Whitton et al. | 177/245 X |
| 3,103,984 | 9/1963 | Ellis et al. | 177/211 |
| 3,970,155 | 7/1976 | Otto | 73/139 |
| 3,995,477 | 12/1976 | Almond | 81/52.5 X |
| 4,073,187 | 2/1978 | Ardeef | 73/139 |

Primary Examiner—George H. Miller, Jr.
Attorney, Agent, or Firm—Christie, Parker & Hale

[57] ABSTRACT

An electronically indicating torque wrench utilizes a variable frequency stress transducer to detect the level of torque applied by the wrench. The stress transducer is operatively coupled to an arm of the wrench, said arm having a mechanical stress that is a function of an applied torquing force. The output of the stress transducer is compared to a reference whose calibration corresponds to desired torque settings. An indicator provides audible and visual indications when the applied torque equals the desired value.

14 Claims, 6 Drawing Figures

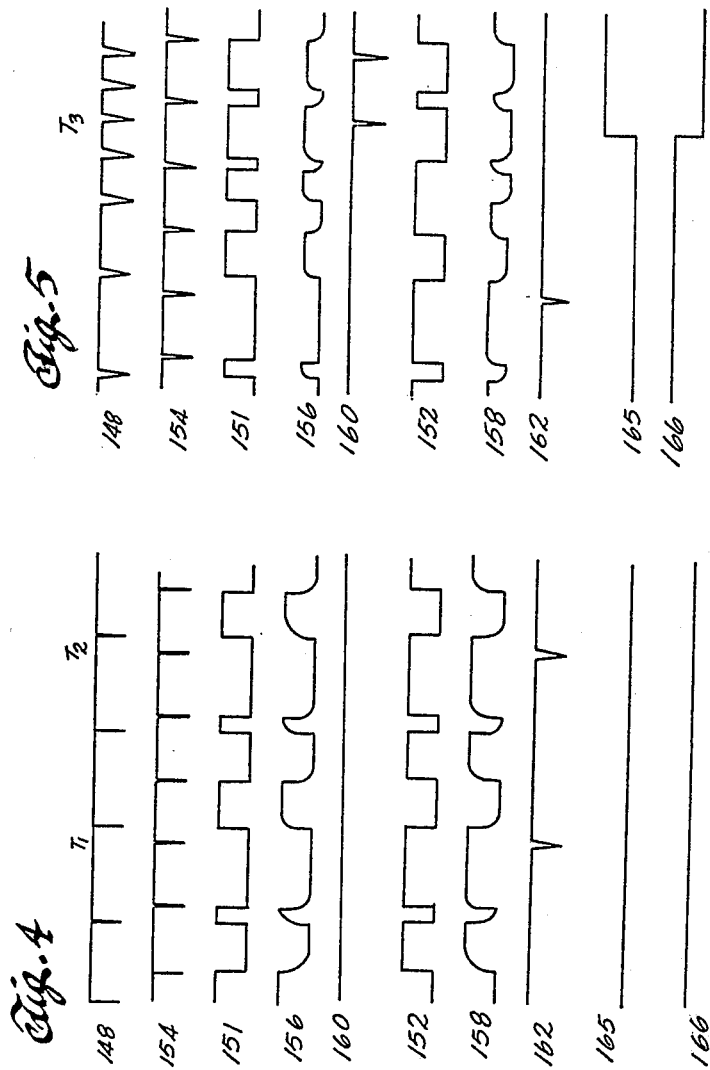

ELECTRONICALLY INDICATING TORQUE WRENCH

CROSS-REFERENCE TO RELATED APPLICATIONS

This application is a continuation-in-part of application, Ser. No. 892,303 filed Mar. 31, 1978, which is incorporated herein by this reference.

BACKGROUND OF THE INVENTION

1. Field of the Invention

This application relates to electronic indicating torque wrenches, and in particular, to a torque wrench that provides audible and visual indications when the desired torque is being applied.

2. Description of the Prior Art

Torque wrenches have found wide application in the tightening together of mechanical parts by means of nuts, bolts and bolt heads. Such wrenches are used to apply predetermined amounts of torque to the nuts and bolt heads for, as an example, precise securement of mating parts found typically in automobile engines and various other machines. Application of such predetermined torque values insures even stressing of the automotive and machine parts in order to minimize warping due to stress variances within the parts. Typically, known predetermined torque settings are required when mating parts, such as used to accommodate passage of fluids therebetween, are separated by compressible gasket seals. To prevent leakage between such parts, uniform compression of the gasket is required, thereby necessitating equal application of torque to the securing bolts.

Additionally, the bolts have mechanical stress limits which, if exceeded either cause their breakage or cause them to experience elongations beyond their yield point. If they are torqued beyond their yield point, loss of uniform stressing between the bolts can occur. Thus, it is important to know at exactly what torque level the bolts are being tightened.

Presently existing torque wrenches typically have an arm that connects a handle to a nut or bolt head engaging end. The nut or bolt head engaging end may have any of a number of configurations such as open end, box end or a socket. For application of torque, the nut or bolt head engaging end is placed over a nut or bolt head, and a torquing force is applied at the handle. Such devices usually have a pointer arm that traverses, upon application of a torquing force, a torque indicator dial located on the wrench handle. The devices are designed such that the user reads the torque indicating dial while he is applying torque to tighten a nut or bolt head. Thus, the user has an instantaneous reading of the applied torque, and can therefore terminate such torque application when it reaches a predetermined value.

In many situations, however, the awkward location of the nut or bolt head to be tightened is such that the physical orientation of the user prevents him from simultaneously applying the torque to the wrench while reading the indicator dial. In such situations, the user must reorient his body posture in order to read the dial, and therefore disturb the application of torque. Thus, the interruption of the torque application process for the purpose of reading the indicator dial, leads to mistorquing and therefore uneven stressing of the tightened bolts.

Such devices also suffer from flexure effects so that the applied torque results in the bending of the wrench arm causing a diminishing of the application of torque to the wrench handle and the bolt to be tightened. These flexure effects may result in mistorquing of the bolts.

The torque indicating dials on presently available devices are usually small and therefore, the small dial setting graduations do not facilitate accurate discrimination between closely valued torque settings, or to the identification of the desired torque value.

Additionally, the devices of the prior art thus far described couple the wrench arm to the nut or bolt head engaging end by means of a coupling spring. The amount of torque applied by the wrench is determined by the displacement of the spring, as read by a pointer arm that is coupled to the spring. Such devices, however, suffer from deterioration and fatigue with respect to time, and therefore there is a loss of accuracy and calibration after repeated usage.

SUMMARY OF THE INVENTION

The present invention contemplates an electronically indicating torque wrench having, handle means for applying a torquing force to the wrench, means for engaging and applying torque to bolt heads and nuts and arm means structurally connecting the handle means to the bolt head and nut engaging means. The arm means is characterized in that its mechanical stress is a function of the torquing force applied to the wrench. A transducer means is operatively coupled to the arm means and responsive to the stress therein such that a transducer means output signal is a function of the stress in the arm means. An indicator means responsive to the transducer means gives indication when the transducer means output signal is at a predetermined value.

The connecting arms are rigid and part of the physical structure of the wrench. The contemplated range of stress values, that the connecting arms experience in normal operation is below its yield point so that the stress within the arm is an essentially linear function of applied torque.

Surrounding a portion of a connecting arm is a series of coil windings that form part of a stress transducer. Coupled to the coil windings and completing the stress transducer is a magnetic multivibrator oscillator. The stress transducer output is a time varying signal whose frequency is a function of the stress within the connecting arm, and therefore a function of the applied torque.

Operation of the electronic wrench relies upon the comparison of the output frequency from the stress transducer to a reference frequency means output. The reference frequency means output produces a pulsing signal whose repetition rate is calibrated to correspond to a desired torque setting. The stress transducer frequency and reference frequency means output are compared in a frequency sensing logic circuit that produces both a series of pulses whose pulse rate is a function of the difference between the applied torque and the desired torque, and a discrete signal that indicates when the applied torque is equal to the desired torque. Both indicators provide the user, therefore, with the option of using one or both indicators in the torque application process.

BRIEF DESCRIPTION OF THE DRAWINGS

FIG. 4 is a graph illustrating the form of electrical outputs from the logic circuits of FIG. 3 for the untorqued case.

FIG. 5 is a graph illustrating the form of electrical outputs from the logic circuits of FIG. 3 when the applied torque approaches and then equals the desired torque.

DETAILED DESCRIPTION

Figure 1:
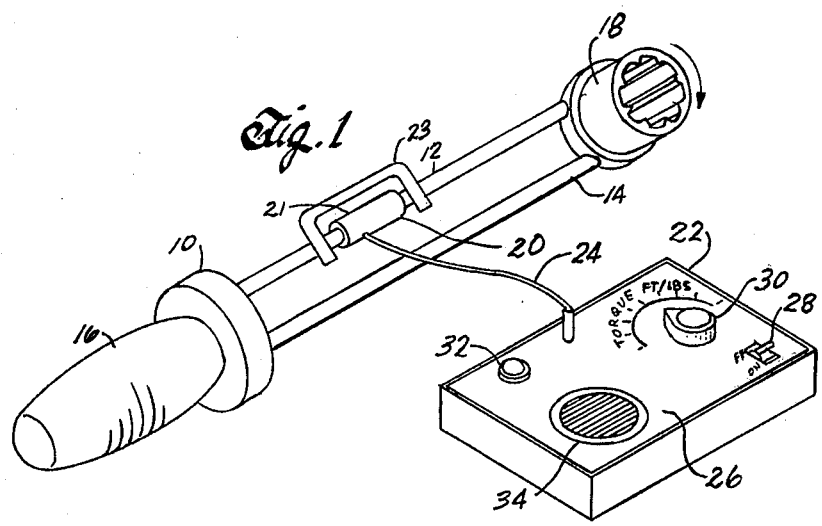
FIG. 1 is a view of an electronic indicating torque wrench constructed in accordance with the present invention.

FIG. 1 shows a block diagram of the present invention. Torque wrench 10 has arms 12 and 14 that structurally couple handle 16 to a nut or bolt head receiving end 18. A torquing force administered to handle 16 results in a torque being applied to a nut or bolt head engaged in end 18. About arm 12 is a series of coil windings 20 wound within a bobbin 21. A yoke 23, formed of an unstressed magnetic material, partially encircles bobbin 21 and provides a magnetic return path for external magnetic flux generated by coil windings 20.

Coil windings 20 are connected to control box 22 by means of interconnect cable 24. The coil windings 20 form part of an arm stress transducer, and control box 22 houses the electronics necessary for operation of the electronically indicating torque wrench. The face 26 of control box 22 has an on/off control switch 28, a torque set control dial 30, a light source 42 and an audio speaker 44.

In a typical application, the user activates the torque wrench electronics by placing control switch 28 in the ON position. A desired torque setting which corresponds to the torque to be applied to a nut or bolt head, is made using torque set dial 30. A pulsing sound is generated in audio speaker 44, and the light 42 is initially de-energized. As the torque wrench is used to apply increasing torque to a nut or bolt head, the repetition rate of the pulsing sound decreases and finally ceases at the point when the applied torque equals the desired value, as set by dial 30. At such a time, light 42 is energized providing an auxiliary visual indication of the coincidence of applied and desired torque.

Figure 2:
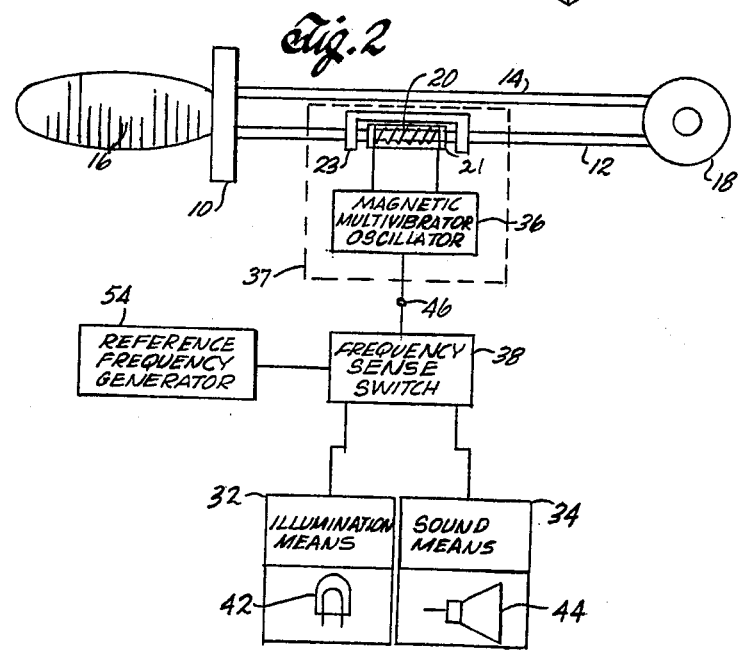
FIG. 2 is a block diagram of the circuits that implement the electronically indicating torque wrench.

Referring to FIG. 2 there is shown a block diagram of the circuits that implement the torque wrench electronics. Typically, the torque wrenches are used to apply predetermined values of torque when tightening nut or bolt heads. FIG. 2 shows the location of the coil windings 20 on arm 12 as would be used for tightening right-handed nut or bolt heads. Thus, in normal operation during the application of torque to right-handed threads, connecting arms 12 and 14 act in tension and compression respectively. Within the range of desired torques applied, the arm 12 elongates below its yield point resulting in elastic deformation which gives rise to a mechanical stress relation within the arm which is essentially a linear function of elongation. For tightening left-handed threaded nut or bolt heads, a suitable change of location of coil windings 20, bobbin 21 and magnetic yoke 23 is made to arm 14 such that arm 14 acts in tension, and arm 12 acts in compression.

A magnetic circuit that includes arm 12, coil windings 20, bobbin 21, yoke 23 and magnetic multivibrator oscillator 36 form stress transducer 37. Coil windings 20, that are wound about insulating bobbin 21, are electrically coupled to magnetic multivibrator oscillator 36. Yoke 23 serves to complete a magnetic flux path around the portion of arm 12 encircled by coil windings 20.

In normal operation, oscillator 36 oscillates at a frequency determined by the time required to alternately drive a magnetic flux generated in coil windings 20 through a flux path that includes magnetic yoke 23 and arm 12. Arm 12 has magnetic characteristics that vary as a function of the mechanical stress in the arm. As the stress in arm 12 varies, the magnetic flux path is altered, thereby changing the time required to drive the generated flux through said path. Thus, the frequency of oscillation of the magnetic multivibrator oscillator 36 is a function of the stress in arm 12, and therefore a measure of the torque applied to wrench 10. The magnetic transducer oscillator circuit, as well as a discussion of its implementation as a stress transducer, is described in my U.S. Patent 4,039,935.

Coupled to the stress transducer 37 is a frequency sense switch 38, and coupled to the frequency sense switch is a reference frequency generator 54 which provides a pulse train signal whose repetition rate is a function of desired torque setting. To the output of the frequency sense switch 38 is coupled signaling means in the form of illumination means 32 and sound means 34. The illumination means 32 includes a light 42 that is energized when the applied torque is equal to or greater than the desired torque. The sound means 34 includes an audio speaker 44 whose output is a train of pulses having a repetition rate related to the difference between the reference frequency generator 54 signal and the stress transducer 37.

In one construction of the preferred embodiment, an untorqued condition produces a high repetition rate signal that decreases in rate upon application of torque and goes to zero when the applied torque equals the desired torque.

In a second construction of the preferred embodiment, an untorqued condition produces a time invariant signal that becomes time variant upon application of torque that is equal to or greater than the desired torque setting. Increasing the applied torque beyond the desired value increases the signal frequency in proportion to the torque in excess of the desired value.

Figure 3:
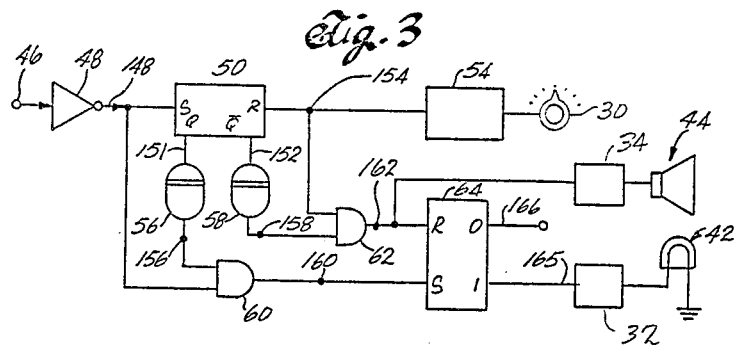
FIG. 3 is a logic block diagram of the circuits of FIG. 2.

FIG. 3 shows in detail the logic diagram of the torque wrench electronics.

The output of stress transducer 37 that appears at terminal 46 is differentiated, amplified and inverted in a signal shaper 48. The output 148 of signal shaper 48 is connected to the set (S) terminal of the flip flop 50. Flip flop 50 is one-half a dual D-type flip flop such as Texas Instruments' Device No. 54L74. To the reset (R) terminal of flip flop 50 is connected the output 154 of reference frequency generator 54. To the "Q" output 151 of flip flop 50 is connected delay circuit 56. The delay time constant, which determines the delay interval, is set to prevent premature gating of a logical AND circuit (to be discussed later). In the preferred embodiment, the delay time constant is set to about 60 microseconds.

The complementary "Q̄", output 152 of flip flop 50 is connected to delay circuit 58. Similarly, the delay time constant for delay circuit 58 is set to about 60 microseconds. The output 156 of delay circuit 56 is connected to one input of a dual input AND gate 60, and the output 148 of signal shaper 48 is connected to the other input of AND gate 60. The output 158 of delay circuit 58 is connected to one input of a dual input AND gate 62, and the output 154 of reference frequency generator 54 is connected to the other input of AND gate 62. An output 160 of AND gate 60 is generated only upon the occurrence of an output pulse (negative going for the electronics described in FIG. 6) at output 148 of signal shaper 48 while output 156 of delay circuit 56 is true (high). Similarly, an output 162 of AND gate 62 is generated only upon the occurrence of an output pulse (negative going for the electronics described in FIG. 6) at output 154 of reference frequency generator 54, while the output 158 of delay circuit 58 is true (high).

The output 160 of AND gate 60 is connected to the set (S) terminal of flip flop 64. Flip flop 64 is a one-half dual D-type flip flop such as Texas Instruments' Device No. 54L74. To the reset (R) terminal of flip flop 64 is connected the output 162 of AND gate 62.

Illumination means 32 that includes light 42, such as a 5 watt bulb, is coupled to the "Q" output 165 of flip flop 64, and sound means 34 that includes an audio speaker 44 is coupled to the output 162 of AND gate 62.

Operation of the circuit is better understood by the use of the signal diagrams of FIG. 4 and FIG. 5.

Referring to FIG. 4, there is shown a time history of signals for the condition when no torque is applied to the wrench. The output 148 of the signal shaper 48 is a train of negative going pulses having a repetition rate that represents the stress transducer frequency for the unstressed condition. The output 154 of reference frequency generator 54 is a train of negative going pulses whose repetition rate represents a desired applied torque. The "Q" output 151 of flip flop 50, responsive to a negative going set pulse at output 148 of signal shaper 48, goes true and remains true until a negative going reset pulse occurs at the output 154 of reference frequency generator 54. The output 156 of delay circuit 56 is compared with output 148 in AND gate 60, and an output 160 is produced only when a pulse at output 148 occurs while output 156 is true.

Correspondingly, the output 158 of delay circuit 58 is compared with the output 154 in AND gate 62, and an output 162 is produced only when a pulse at output 154 occurs while output 158 is true.

For the above conditions, pulses at output 162 occur at times T1 and T2. Since a pulse (not shown) prior to time T1 has reset flip flop 64, the "Q" output 165 of the flip flop 64 is in the false or low state, and the "Q̄" output 166 is in the true or high state. Repeated pulses, therefore, appearing at output 162 do not alter the state of flip flop 64 since it is reset.

The sound means 34 may be connected to either output 162 or 160. The audio speaker 44 coupled to output 162 emits a series of pulsing sounds, which as will be shown later, decreases in repetition rate as applied torque is increased. At such time that the applied torque equals the desired value, the pulsing sound from audio speaker 44 terminates.

Conversely, with the torque below the desired value, the output 160 is time invariant, thereby producing no sound from audio speaker 44 connected thereto. As will be shown later, as the torque exceeds the desired value, output 160 commences pulsing with an increasing repetition rate indicating that the applied torque has exceeded the desired value.

The light means 32 connected to the "Q" output 165 of flip flop 64 is de-energized when the applied torque is less than the desired value.

Referring now to FIG. 5, there is shown a signal diagram illustrating the condition when the applied torque approaches and then equals the desired value. As the applied torque increases, the stress transducer 37 frequency increases as shown by the increasing repetition rate of the pulses at output 148. At time T3, the applied torque is such that a negative pulse at output 148 occurs concurrently with the existence of the true state at output 156. Thus, a set pulse appears at the output 160 of AND gate 60, and the flip flop 64 is set causing the flip flop "Q" output 165 to become true. At such time, the light 42 is energized indicating that the applied torque equals the desired torque. Simultaneously, the pulsing sound being emitted by audio speaker 44 connected to the output 162 of AND gate 62 terminates.

Figure 6:
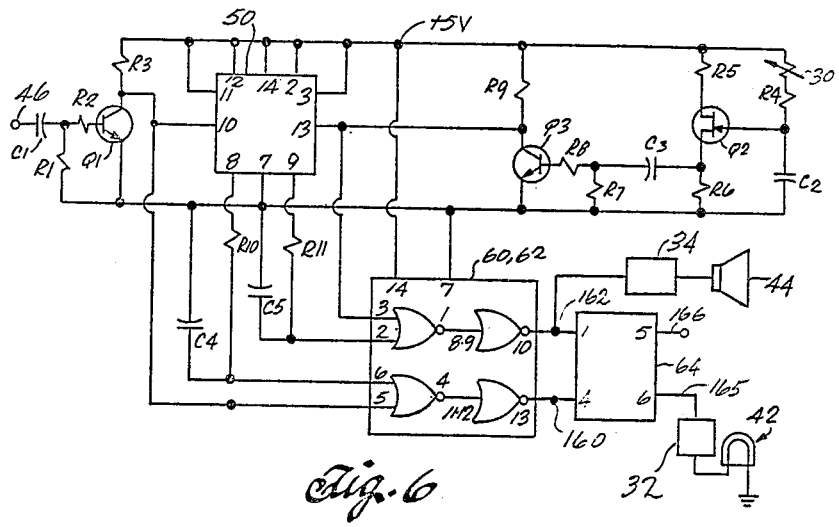
FIG. 6 is a schematic electrical circuit diagram of the electronically indicating torque wrench illustrated in block diagram form in FIG. 3.

Referring to FIG. 6, there is shown a schematic diagram of the torque wrench electronics. The stress transducer 37 signal appearing at terminal 46 is shaped by a differentiator circuit comprising C1 and R1 and is inverted and amplified by the circuit comprising transistor Q1 and resistors R2 and R3.

The reference frequency generator 54 includes unijunction transistor Q2, in a relaxation oscillator arrangement with resistors R5 and R6, variable resistor R4 and capacitor C2. Variable resistor R4, that is adjusted by torque set dial 30, sets the oscillator frequency, which is calibrated to correspond to specific desired torque settings. The output of the unijunction relaxation oscillator is shaped by means of a differentiator circuit comprising C3 and R7 and is inverted and amplified by the circuit comprising transistor Q3 and resistors R8 and R9. Flip flop 50 and flip flop 64, as previously described, are Texas Instruments' Devices, and the pinout numbers indicated in FIG. 6 refer to the pinout according to one Texas Instruments' Device No. 54L74. The set, reset, "Q" and "Q̄" ouputs of the flip flop 50 in FIG. 6 have been interchanged merely for functionally achieving the AND gates 60 and 62 which are mechanized using a Texas Instruments' Device No. 54L02 positive NOR circuit. The pinout numbers indicated in FIG. 6 for blocks 60 and 62 refer to the pinout according to Texas Instruments' Device No. 54L02. The overall circuit operation, however, conforms, as may be shown by De Morgans Theorem, to that previously described using the logic diagram of FIG. 3.

The delay circuits 56 and 58 are implemented using resistor-capacitor time delay circuits, thus, R10 and C4 form delay circuit 56, and R11 and C5 form delay circuit 58.

While the basic principle of this invention has been herein illustrated, it will be appreciated by those skilled in the art that variations in the disclosed arrangement both as to its details and as to the organization of such details may be made without departing from the spirit and scope thereof. For example, a strain gauge may be secured to the connecting arm 12 thereby monitoring the stress in arm 12, and therefore, the applied torque. The magnetic multivibrator oscialltor may be modified to cooperate with the strain gauge such that its frequency of oscillation is a function of the strain gauge output. Accordingly, it is intended that the foregoing disclosure and the showings made in the drawings will be considered only as illustrative of the principles of the invention and not construed in a limiting sense.

What is claimed is:

1. An electronically indicating torque wrench comprising:

handle means for applying torquing force to the wrench;

arm means structurally connected at one end to the handle means, said arm means having a mechanical stress that is a function of the torquing force applied to the wrench the arm means having magnetic characteristics that vary as a function of the mechanical stress in said arm means;

means connected to the other end of the arm means for engaging bolt heads and nuts, said means imparting torque, caused by the torquing force, to said bolt heads and nuts;

transducer means operatively coupled to the arm means and responsive to the stress therein such that a transducer means output signal is a function of the stress in the arm means; and indicator means responsive to the transducer means for indicating when the transducer means output signal is at a predetermined value.

2. A wrench according to claim 1 wherein the transducer means includes:

magnetic multivibrator means having a frequency of oscillation that is a function of the magnetic characteristics of the arm means; and means for coupling the magnetic multivibrator means to the arm means.

3. A wrench according to claim 2 wherein the means for coupling the magnetic multivibrator means to the arm means is a coil inductively coupled to the arm means.

4. A wrench according to claim 3 wherein the indicator means includes, frequency sense means coupled to the magnetic multivibrator means for providing an output when the magnetic multivibrator means frequency is at a predetermined value;

torque set means coupled to the frequency sense means for setting the predetermined value corresponding to a desired applied torque; and signaling means responsive to the frequency sense means output such that a signal is generated in accordance with the frequency sense means output.

5. A wrench according to claim 4 wherein the signaling means includes illumination means to give visual indication signal when the applied torque is at a predetermined value.

6. A wrench according to claim 5 wherein the signaling means includes sound means to give audible indication signal when the applied torque is at a predetermined value.

7. A wrench according to claim 6 wherein the torque set means is a reference frequency signal means to produce a reference signal that is a function of a desired torque.

8. A wrench according to claim 7 wherein the frequency sense means includes:

signal shaping means coupled to the magnetic multivibrator means, the signal shaping means having an output signal representing the shaped output of the magnetic multivibrator means;

first flip flop means coupled to both the reference frequency signal means and the signal shaping means, said first flip flop means having a plurality of states such that the state of the first flip flop means is a function of the reference frequency signal and the signal shaping means output signal;

first delay means coupled to the first flip flop means, said first delay means having an output signal delayed in time from its input signal by a delay interval value;

first gating means coupled to the first delay means and to the signal shaping means such that a first gating means output is generated upon the coincidence of the first delay means output and the signal shaping means output;

second delay means coupled to the first flip flop means, said second delay means having an output signal delayed in time from its input signal by a delay interval value;

second gating means coupled to the second delay means and the reference frequency signal means such that a second gating means output is generated upon the coincidence of the second delay means output and a reference frequency signal; and second flip flop means having a first and a second state, said second flip flop means responsive to the first and second gating means such that the first state of the second flip flop means is an indication when the frequency of the magnetic multivibrator means is greater than the predetermined value, and the second state of the second flip flop means is an indication when the frequency of the magnetic multivibrator means is less that the predetermined value.

9. A wrench according to claim 8 wherein the first flip flop means has a logical true state and a logical false state and a first and second output, said second output being the complement of the first output, the first output being in a logical true state when the flip flop is set, the second output being in a logical true state when the flip flop is reset, the first flip flop means being set by the signal shaping means and reset by the reference frequency signal means.

10. A wrench according to claim 9 wherein the first delay means is coupled to the first output of the first flip flop means and the second delay means is coupled to the second output of the first flip flop means.

11. A wrench according to claim 10 wherein the second flip flop means has a logical true state and a logical false state and a first and a second output, said second output being the complement of the first output, the first output being in a logical true state when the second flip flop means is set, the second output being in a logical true state when the second flip flop means is reset, the second flip flop means being set by the first gating means and reset by the second gating means.

12. A wrench according to claim 11 wherein the signal shaping means includes a differentiating means and inverting amplifier means.

13. A wrench according to claim 12 wherein the illumination means includes lighting source means coupled to the second flip flop means such that visual indication is given when the applied torque is at the predetermined value.

14. A wrench according to claim 13 wherein the sound means includes speaker means coupled to either the first or second gating means outputs such that audible indication is given when the applied torque is at a predetermined value.

* * * * *